US010795804B1

(12) United States Patent
Nygaard et al.

(10) Patent No.: US 10,795,804 B1
(45) Date of Patent: Oct. 6, 2020

(54) COLLISION EVALUATION FOR LOG-BASED SIMULATIONS

(71) Applicant: Waymo LLC, Mountain View, CA (US)

(72) Inventors: Carl Nygaard, Sunnyvale, CA (US); Alexander Ruben Stacey McCarthy, San Francisco, CA (US); James Stout, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 80 days.

(21) Appl. No.: 16/107,023

(22) Filed: Aug. 21, 2018

(51) Int. Cl.
G06F 11/36 (2006.01)
(52) U.S. Cl.
CPC ...... G06F 11/3664 (2013.01); G06F 11/3684 (2013.01)
(58) Field of Classification Search
CPC G06F 11/3664; G06F 11/3684; G05D 1/0027
See application file for complete search history.

(56) References Cited

U.S. PATENT DOCUMENTS

| | | | | |
|---|---|---|---|---|
| 9,606,539 | B1* | 3/2017 | Kentley | B60Q 1/50 |
| 9,632,502 | B1* | 4/2017 | Levinson | G05D 1/0027 |
| 10,019,011 | B1* | 7/2018 | Green | G05D 1/0223 |
| 10,431,023 | B1* | 10/2019 | Watson | G05D 1/0088 |
| 10,599,546 | B1* | 3/2020 | Walther | G06F 11/3013 |
| 2006/0004862 | A1* | 1/2006 | Fisher | G09B 19/00 |
| 2017/0132118 | A1* | 5/2017 | Stefan | G06F 11/3668 |
| 2017/0132334 | A1 | 5/2017 | Levinson et al. | |
| 2017/0286570 | A1 | 10/2017 | Kim et al. | |
| 2017/0334450 | A1 | 11/2017 | Shiraishi et al. | |
| 2018/0107770 | A1 | 4/2018 | Cahoon et al. | |
| 2018/0341571 | A1* | 11/2018 | Kislovskiy | G06F 11/0706 |
| 2019/0129831 | A1* | 5/2019 | Goldberg | G06F 3/04845 |
| 2019/0163182 | A1* | 5/2019 | Li | G09B 19/167 |

(Continued)

OTHER PUBLICATIONS

Cumhur Erkan Tuncali et al., "Simulation-based Adversarial Test Generation for Autonomous Vehicles with Machine Learning Components", [Online], Jun. 2018, pp. 1555-1562, [Retrieved from Internet on Dec. 17, 2019], <https://ieeexplore.ieee.org/stamp/stamp.jsp?tp=&arnumber=8500421>.*

(Continued)

Primary Examiner — Ziaul A Chowdhury
(74) Attorney, Agent, or Firm — Botos Churchill IP Law

(57) ABSTRACT

The disclosure relate to testing software for operating an autonomous vehicle. For instance, a first simulation may be run. The simulation may be run using the software to control a simulated vehicle and at least one agent. During the running of the first simulation, whether a particular type of interaction between the simulated vehicle and the at least one agent has occurred may be determined. In response to this determination, a second simulation may be run using the log data by replacing the at least one agent with a model agent that simulates a road user capable of responding to actions performed by the simulated vehicle. The second simulation may be used to determine in order to determine whether the software is able to complete the second simulation without the particular type of interaction between a second simulated vehicle and the model agent occurring.

20 Claims, 10 Drawing Sheets

(56) References Cited

U.S. PATENT DOCUMENTS

2019/0278698 A1* 9/2019 Ahner .................. G06F 30/15
2020/0001888 A1* 1/2020 Pretsch .............. G06F 11/3664

OTHER PUBLICATIONS

José L. F. Pereira et al., "An Integrated Architecture for Autonomous Vehicles Simulation", [Online], 2011, pp. 286-292, [Retrieved from Internet on Dec. 17, 2019], <http://delivery.acm.org/10.1145/2250000/2245333/p286-pereira.pdf>.*

Baekgyu Kim et al., "Testing Autonomous Vehicle Software in the Virtual Prototyping Environment", [Online], 2017, pp. 5-8, [Retrieved on Dec. 26, 2019], <https://ieeexplore.ieee.org/stamp/stamp.jsp?tp=&arnumber=7797233>.*

Feng Luo et al., "Intelligent Vehicle Simulation and Debugging Environment Based on Physics Engine", [Online], 2009, pp. 329-333, [Retrieved from Internet on May 26, 2020], <https://ieeexplore.ieee.org/stamp/stamp.jsp?tp=&arnumber=4777252>.*

Rico Angell et al., "Themis: Automatically Testing Software for Discrimination", [Online], 2018, p. 871-875, [Retrieved from Interent on May 26, 2020], <https://dl.acm.org/doi/pdf/10.1145/3236024.3264590>.*

Michael G. Hinchey et al, "Verification and Validation of Autonomous Systems", [Online], 2001,p. 1-9, {Retrieved from Interent on May 26, 2020]. <https://ieeexplore.ieee.org/stamp/stamp.jsp?arnumber=992667>.*

* cited by examiner

COLLISION EVALUATION FOR LOG-BASED SIMULATIONS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. It is critical that the autonomous control software used by these vehicles to operate in the autonomous mode is tested and validated before such software is actually used to control the vehicles in areas where the vehicles are interacting with other objects.

BRIEF SUMMARY

One aspect of the disclosure provides a method of testing software for operating a vehicle in an autonomous driving mode. The method includes running a first simulation using log data collected by a vehicle operating in an autonomous driving mode, wherein the simulation is run using the software to control a first simulated vehicle, and the log data identifying at least one agent included in the first simulation; during the running of the first simulation, determining that a particular type of interaction between the first simulated vehicle and the at least one agent has occurred; in response to determining that the particular type of interaction between the first simulated vehicle and the at least one agent has occurred, running a second simulation using the log data by replacing the at least one agent with a model agent that simulates a road user capable of responding to actions performed by simulated vehicles, wherein the second simulation is run using the software to control a second simulated vehicle; and determining whether the particular type of interaction between the simulated vehicle and the model agent has occurred in order to determine whether the software is able to complete the second simulation without the particular type of interaction between the second simulated vehicle and the model agent having occurred.

In one example, the particular type of interaction is a collision, and the method further comprises, when a collision between the second simulated vehicle and the model agent is determined to have occurred, flagging the second simulation for further review. In another example, the method also includes, when the software is determined to be not able to complete the second simulation without a collision, determining that the particular type of interaction between the second simulated vehicle and a second agent during the second simulation, the second agent being identified in the log data and included in the first simulation; in response to determining the particular type of interaction between the second simulated vehicle and the second agent has occurred, running a third simulation using the log data by replacing the second agent with a second model agent that simulates a road user capable of responding to actions performed by simulated vehicles, and wherein the third simulation is run using the software to control a third simulated vehicle; and monitoring the third simulation to determine whether the particular type of interaction between the second simulated vehicle and the second model agent has occurred in order to determine whether the software is able to complete the third simulation without the particular type of interaction between the third simulated vehicle and model agent having occurred. In this example, the method also includes continuing to run additional simulations by replacing additional agents identified in the log data with model agents until a predetermined number of model agents is included in one of the additional simulations. In addition, the method also includes, when the particular type of interaction between the simulated vehicle and at least one model agent is determined for each of the additional simulations, flagging one or more of the first simulation, the second simulation, the third simulation, or the additional simulations for further review. In addition or alternatively, the particular type of interaction is a collision, and the method also includes, when a collision between the third simulated vehicle and the second model agent is determined, flagging the third simulation for further review. In another example, the method also includes before running the second simulation, selecting the model agent from a plurality of different model agents based on a type of at least one agent. In another example, the method also includes identifying a particular action of the first simulated vehicle during the first simulation, and in response to identifying the particular action, running a second simulation using the log data by adding a second model agent, wherein the second model agent is a model that simulates a road user capable of responding to actions performed by simulated vehicles. In this example, the particular action includes partially exiting and re-entering a lane. Alternatively, the particular action includes decelerating a predetermined amount over a predetermined period of time. As another alternatively, the particular action includes swerving within a lane. In addition or alternative, running the third simulation includes placing the second model agent at a location through which the simulated vehicle passes at a time when the simulated vehicle performed the particular action during the first simulation. In another example, the second simulated vehicle in the second simulation is a same simulated vehicle as the first simulated vehicle in the first simulation.

Another aspect of the disclosure provides a method of testing software for operating a vehicle in an autonomous driving mode. The method includes running a first simulation using log data collected by a vehicle operating in an autonomous driving mode, wherein the first simulation is run using the software to control a first simulated vehicle, the log data identifying at least one agent included in the first simulation; during the running of the first simulation, identifying a particular action of the first simulated vehicle; in response to identifying the particular action, running a second simulation using the log data by adding a model agent, wherein the model agent is a model that simulates a road user capable of responding to actions performed by simulated vehicles, and wherein the second simulation is run using the software to control a second simulated vehicle; and determining whether a particular type of interaction between the second simulated vehicle and the model agent in order to determine whether the software is able to complete the second simulation without the particular type of interaction between the second simulated vehicle and the model agent having occurred.

In one example, the particular type of action is a collision and the method further comprises, when a particular type of interaction between the simulated vehicle and with the second model agent occurs, flagging the second simulation for further review. In another example, the particular action includes partially exiting and re-entering a lane. In another example, the particular action includes decelerating a predetermined amount over a predetermined period of time. In another example, the particular action includes swerving within a lane. In another example, running the second simulation includes placing the second model agent at a location through which the simulated vehicle passes at a time when the simulated vehicle performed the particular action during the first simulation. In this example, the second simulated vehicle in the second simulation is a same simulated vehicle as the first simulated vehicle in the first simulation.

DETAILED DESCRIPTION

Overview

Figure 1:
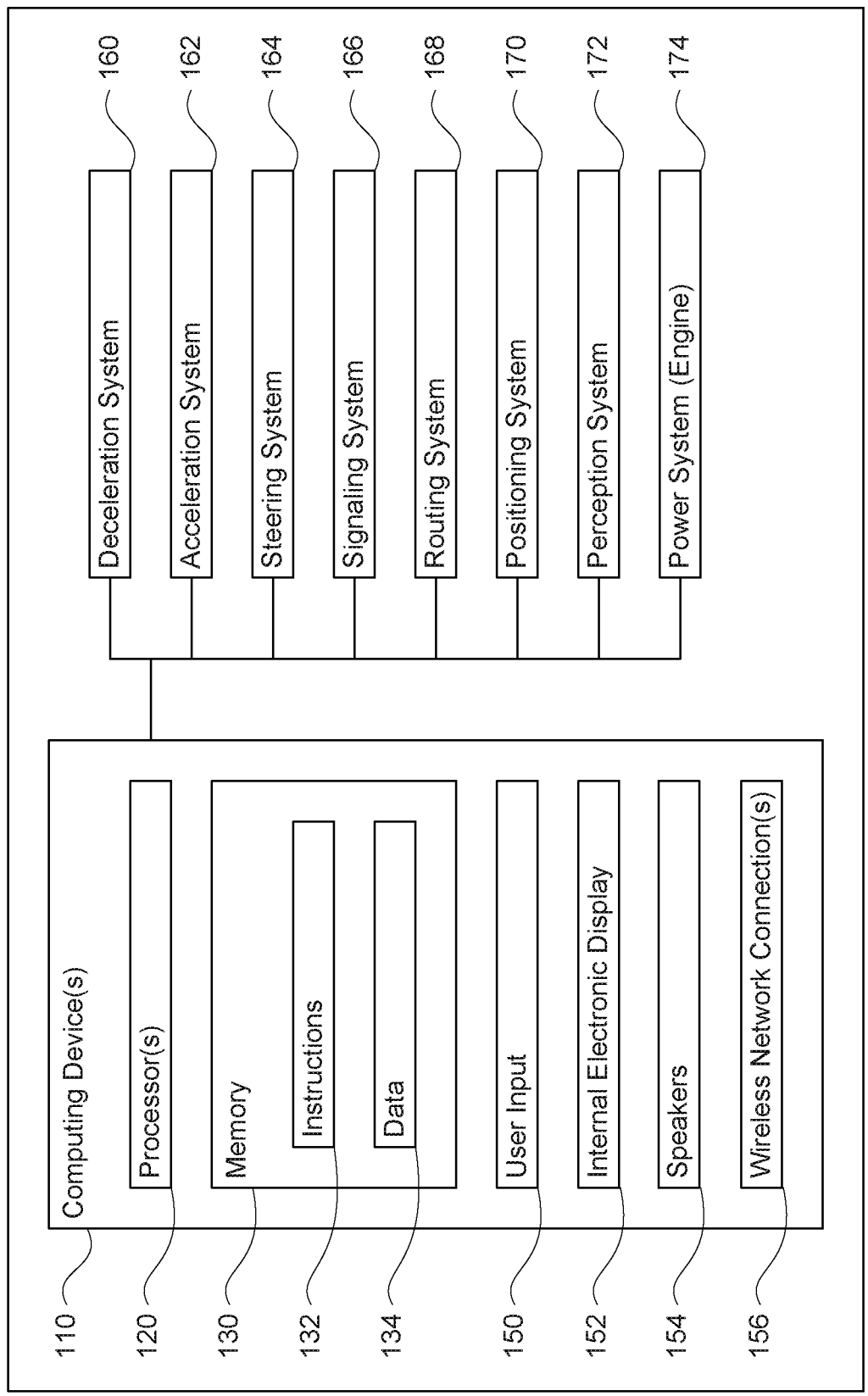
FIG. 1 is a functional diagram of an example vehicle in accordance with an exemplary embodiment.

The technology relates to evaluating interactions in log-based simulations using software for vehicles operating autonomously. The log-based simulations correspond to simulations which are run using log data collected by a vehicle operating in an autonomous mode over some brief period of time such as 1 minute or more or less. The log data may include information from the vehicle's various systems including perception, routing, planning, positioning, etc. At the same time, the actual vehicle is replaced with a simulated vehicle which can make decisions using software for controlling the vehicle autonomously. By doing so, the software can be rigorously tested. For instance, the simulations may be used to determine whether a particular type of event or interaction with another agent has occurred, such as a particular type of behavior, collision, or near collision. As an example, these events and interactions may be used for various purposes, such as determining whether the software can be rigorously tested to determine whether the software can "pass" a given simulation without a collision or near collision without requiring a vehicle to physically drive "real" miles or having to "manufacture" situations in the real world.

However, when running simulations using logged data, changing the behavior of the autonomous vehicle, such as by testing a different software version than that used to log the log data, can cause unintended consequences. These consequences may include collisions or near collisions for instance coming within some small distance, such as 10 centimeters or more or less, of another object, or inappropriate responses as the behaviors of the agents or road users such as vehicles, pedestrians, bicyclists, etc. in these simulations are fixed in the log data. In other words, no matter what the simulated vehicle does, the agents will always react according to the log data. As such, for simulations which involve the vehicle responding to more than one agent, the simulation may be considered realistic only for the vehicle's first in time response to one of the agents or first in time behavior that diverges from the behavior of the vehicle in the log data. This creates unrealistic situations within the simulations and can make them unreliable for testing vehicle software. In other words, the simulation may result in collisions or near collisions that may not actually have occurred which may be considered "failures" of a particular simulation which may need to be reviewed by an operator to determine whether there was an issue with the software or the simulation.

To avoid wasting time and resources on this analysis, one or more of the simulated agents may be replaced with an agent that has some responsive capabilities (e.g. a model agent). For instance, simulated agents corresponding to other road users, such as vehicles, pedestrians, bicyclists, etc. may be replaced with model agents. In addition to replacing road users with model agents, additional model agents may be added to the simulation to confirm that the simulated vehicle's behavior was an appropriate response. As a result, from the log data for a single simulation, a plurality of different types of simulations may be created.

In some instances, when running a simulation, all of the agents in the log data may be replaced by a model agent. However, in such cases, because the model agents may be perfectly perceived by the simulated vehicle, certain issues with the software's perception pipeline may be missed. In addition, using more of the data from the log data is likely to have higher fidelity to reality than using less. In other words, aggressive drivers may become more polite or vice versa depending on the model agent. As such, to make the simulations as realistic as possible, other approaches may be used.

For instance, while a simulation is run, the simulation may be monitored to identify particular types of interactions with other agents such as collisions or near collisions between the simulated vehicle and another agent. If there are no collisions or near collisions, the software may be considered to have "passed" the simulation or may be considered to be validated for that specific simulation. If a collision or near collision with an agent is identified, a new simulation is run with the agent replaced by a model agent. The original simulation may also continue to run in order to collect additional data.

The type of model agent used in the new simulation may be selected based on the details of the agent defined in the log data used to run the new simulation. If there is still a collision or near collision with the model agent both of these simulations may be flagged for review by an operator. If there is no collision or near collision with the model agent, but a collision or near collision with a second agent in the new simulation, another new simulation may be run with the second agent replaced with a model agent. If there are no collisions or near collisions, the software may be considered to have "passed" the simulation or may be considered to be validated for that specific simulation. If there is a collision or near collision with an agent, another new simulation may be run replacing that agent with a model agent. This may continue for a predetermined number of times or until there are no agents that have not been replaced. At this point, if there is still a collision or near collision all of these simulations may be flagged for review by an operator.

In addition or alternatively, rather than iterating through simulations by replacing the agent which collides with the simulated vehicle with a model agent, after a first simulation is run, a new simulation may be run where all of the agents in the first simulation which collide or nearly collide with the simulated vehicle may be replaced by model agents. In some instances, other agents may be removed. However, certain agents, such as a parked vehicle may neither be replaced nor removed. At this point, if there is still a collision or near collision both of these simulations may be flagged for review by an operator.

In order to identify problematic behaviors, in addition to monitoring for collisions or near collisions, the simulations may be monitored for specific types of behaviors which would result in unintended consequences, such as behaviors that may cause problems with other road users in non-simulated situations. For instance, if the vehicle responds to a simulation in a certain way, another agent may be added to the simulation to determine whether that response was effective and appropriate.

The features described herein may provide for a safe, effective, and realistic way of testing software for autonomous vehicles. For instance, the software can not only be tested in hundreds of thousands of scenarios without endangering the life and property of actual persons. At the same time, replacing one or more agents with a model agent, the number of simulations that are flagged for review by an operator can be dramatically reduced while still ensuring that the software is tested as realistically as possible. This thus reduces the time and other resources required to review simulations that are not actually true "failures". In addition, those simulations that are flagged may be more critically important to determining how to revise or update the software being tested. Further, by adding in additional model agents "new" simulations can be created which allow for analysis of a plurality of potential safety issues without requiring new log data for such simulations. Other benefits may include the ability of a software developer to experiment with behavior changes and use this to display lots of realistic examples of how their change plays out. This could allow for much faster feature development, since the alternatives would involve the developer sifting through lots of spurious failures themselves, waiting for an operator to do the same, or to drive a real vehicle around with the behavior change to log real responses. Moreover, without such testing, the risks of injury to persons or property using untested software may be too great.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
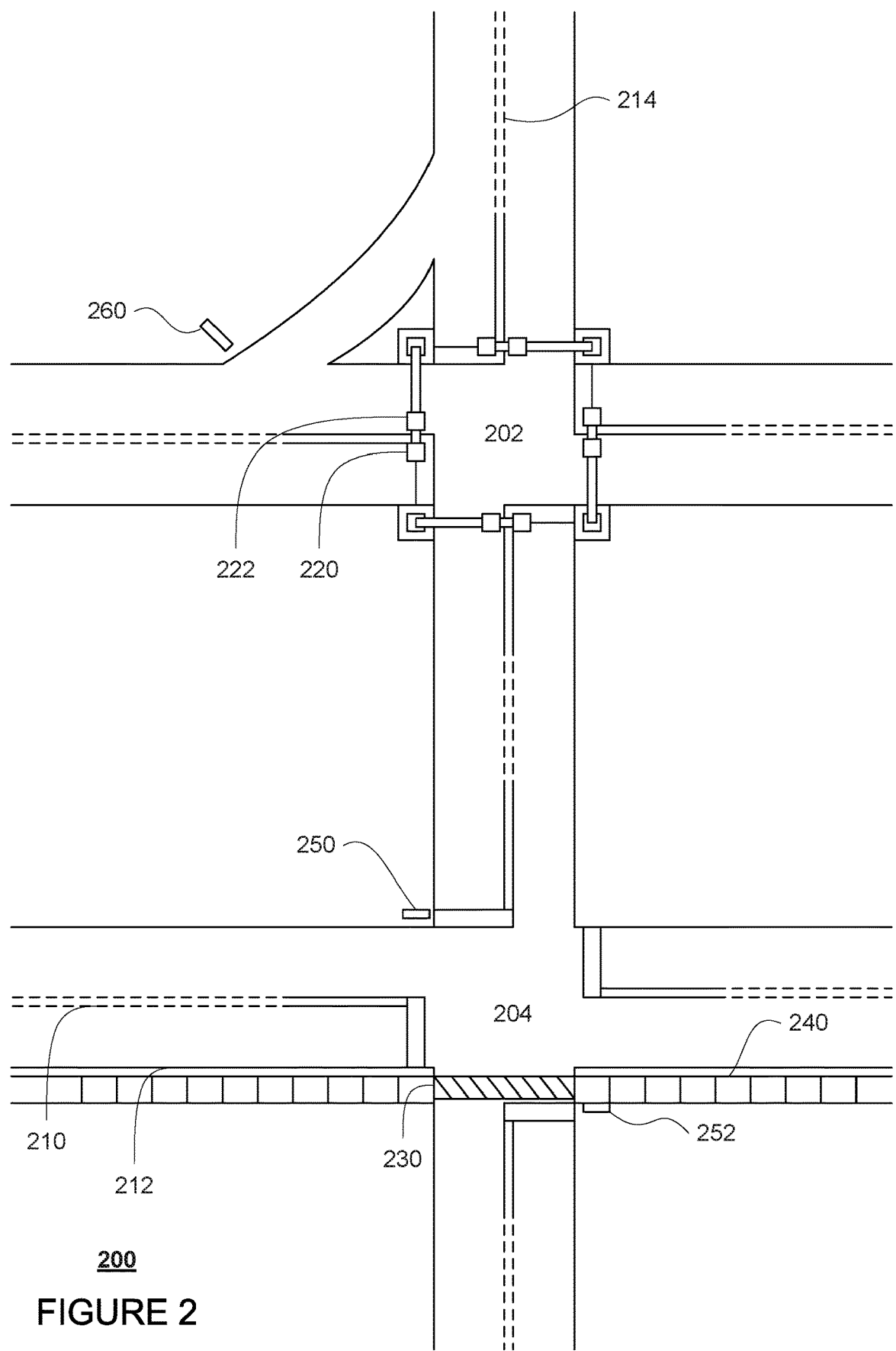
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
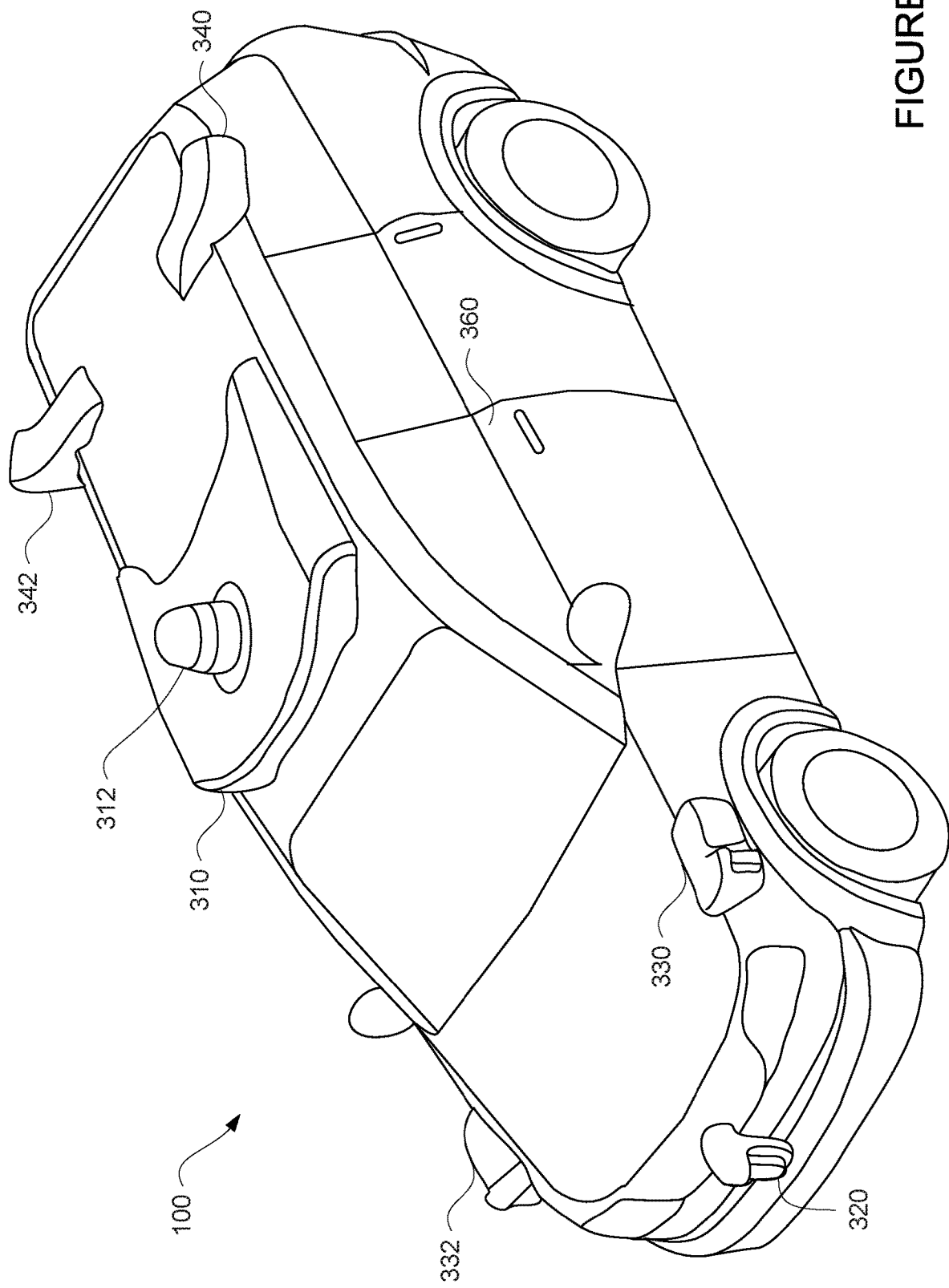
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
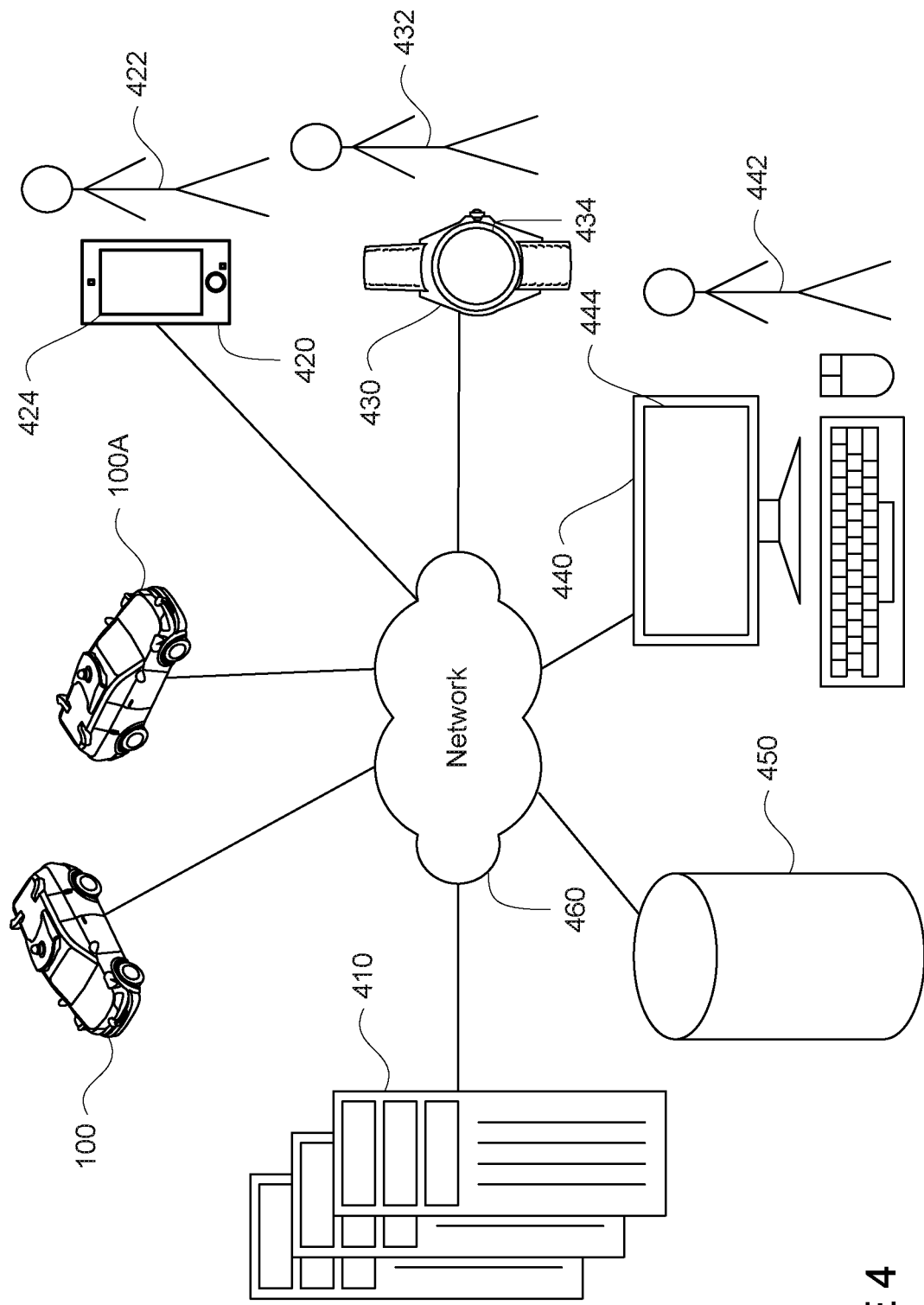
FIG. 4 is a pictorial diagram of an example system in accordance with aspects of the disclosure.
Figure 5:
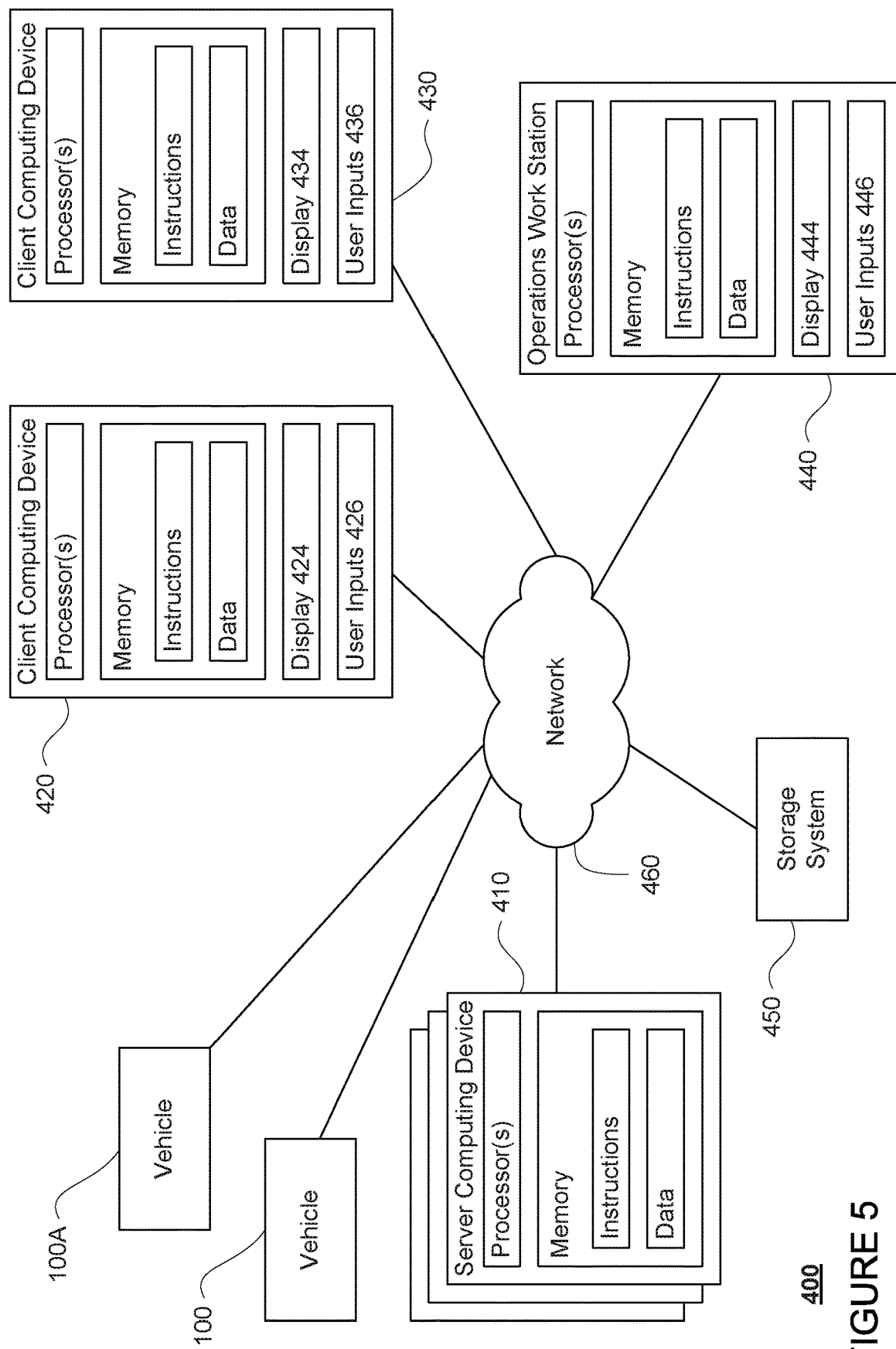
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include, for instance, sensor data generated by a perception system, such as perception system 172 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle 100, actual locations of the vehicles at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation.

The storage system may also store model agents, or data and instructions that can be used to generate a simulated road user in order to interact with a virtual vehicle in a simulation. Because there are different types of road users, there may be different types of model agents. For instance, there may be model agents for vehicles (or to specific types of vehicles, such as a bus, van, small car, truck, motorcycle, police car, ambulance, etc. for greater granularity). Because humans are generally unpredictable, the models may be generated by establishing a set of characteristics. These may relate to the reaction times, for instance for reacting to visual or audible stimuli by moving a foot or a hand to change braking, acceleration, and/or steering behaviors of a vehicle as with a human driver, pedestrian, bicyclist. In other words, the model may include models for how an ideal, average, or below average human would brake or swerve which are available from existing human reaction research. In this regard, the models may be approximate and hand tuned, and likely to respond in more predictable ways than typical human drivers. In some instances, the models may also have behavioral rules, such as how a typical driver would behave at a 4-way stop or respond to a child in the environment, etc.

In addition, the storage system 450 may also store autonomous control software which is to be used by vehicles, such as vehicle 100, to operate a vehicle in an autonomous driving mode. This autonomous control software stored in the storage system 450 may be a version which has not yet been validated. Once validated, the autonomous control software may be sent, for instance, to memory 130 of vehicle 100 in order to be used by computing devices 110 to control vehicle 100 in an autonomous driving mode.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to test and/or validate the autonomous control software which will be stored in memory 130 for use by the computing devices 110 of vehicle 100, the server computing devices 410 may run various simulations. These simulations may be log based simulations that are generated from the information stored in the aforementioned log data of storage system 450. In this regard, the server computing devices 410 may access the storage system 450 in order to retrieve the log data and run a simulation. For instance, a portion of the log data corresponding to a minute in real time of an autonomous vehicle that generated the log data may be retrieved from the storage system. This portion of log data may be "hand" selected by human operators and/or computing devices based on the types of events recorded in the logs or more randomly, for instance, by selecting 1% or more or less of all autonomous driving logs.

The retrieved portion of log data may be used to run an initial simulation. When running the autonomous control software through the portion of log data, the details (sensor data and events) of the log data may be used to generate a simulation. In other words, the sensor data of the portion of log data may simply be "played" as input to the perception system 172 of a simulated vehicle controlled by the autonomous control software. In this regard, the autonomous control software "experiences" or processes the log data as if the autonomous control software was actually being run on vehicle 100. In other words, the simulation may include data defining characteristics of objects such as shape, location, orientation, speed, etc. of objects such as vehicles, pedestrians, bicyclists, vegetation, curbs, lane lines, sidewalks, crosswalks, buildings, etc. defined by the sensor data of the log data. Further, the simulation may include characteristics for a virtual vehicle, corresponding to vehicle 100, including the virtual vehicle's shape, location, orientation, speed, etc. defined by the events of the log data.

Figure 6:
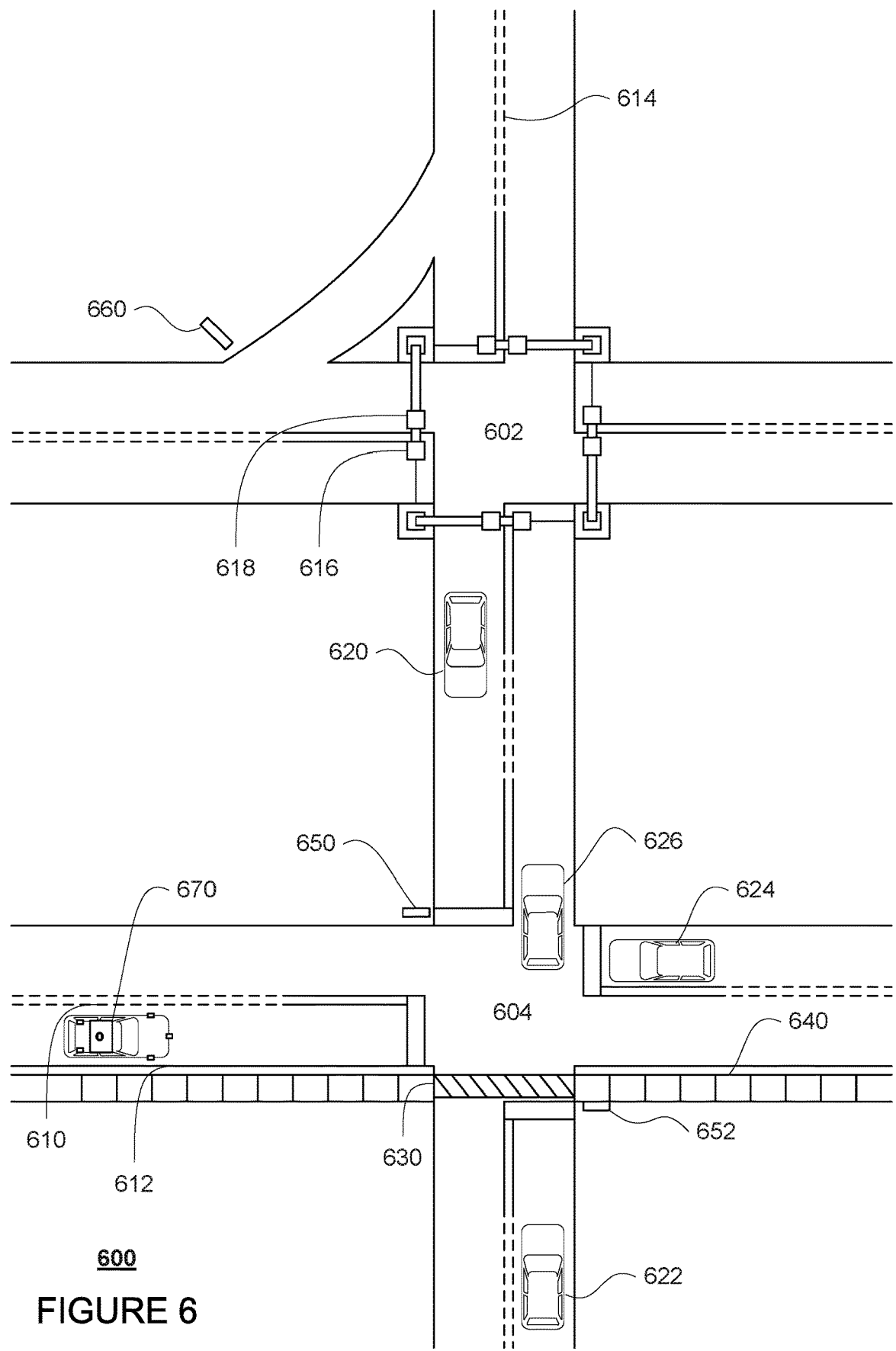
FIG. 6 is an example representation of a simulation in accordance with aspects of the disclosure.

FIG. 6 provides an example 600 of a simulation for a section of roadway corresponding to the map information 200. In this example, intersections 602 and 604 correspond to intersections 202 and 204, respectively. In this regard, the shape, location, and other characteristics of lane lines 210, 612, 614, traffic signal lights 616, 616, crosswalk 630, sidewalks 640, stop signs 650, 652, and yield sign 660 corresponds to the shape, location and other characteristics of lane lines 210, 212, 214, traffic signal lights 220, 222, crosswalk 230, sidewalks 240, stop signs 250, 252, and yield sign 260. In example 600, a simulated vehicle 670, corresponding to vehicle 100 or vehicle 100A, is approaching an intersection 604. An agent vehicles 620, 622, 624, 626, generated from sensor data and/or event data from the log data for the simulation, are also approaching or passing through intersection 604.

In some instances, the autonomous control software is only provided with information which the perception system 172 would be able to detect about the scenario, and not every detail of the scenario. For instance, returning to example 600, the server computing devices 410 may run the scenario such that the autonomous control software is given access to the detailed map information 200 as well as any information that would be detected by a perception system of the simulated vehicle 670.

As noted above, when running simulations using logged data, changing the behavior of the autonomous vehicle, such as by testing a different software version than that used to log the log data, can cause unintended consequences, such as collisions or near collisions with other agents in the simulation. Such collisions or near collisions may not have occurred if the simulated vehicle were interactive with "real-world" agents that could respond to the behaviors of the simulated vehicle. As such, analysis of such collisions or near collisions may be a waste of resources. To avoid such waste, one or more of the simulated agents may be replaced with an agent that has some responsive capabilities (e.g. a model agent).

In some instances, when running a simulation, all of the agents in the log data may be replaced by a model agent. For instance, referring to example, 600, all of agent vehicles 620, 622, 624, and 626 may be replaced by model agents from storage system 450. However, in such cases, because the model agents may be perfectly perceived (i.e. have sharp, clear edges and boundaries) by the simulated vehicle, certain issues with the software's perception system (i.e. the software corresponding to perception system 172) may be missed. In addition, using more of the data from the log data is likely to have higher fidelity to reality than using less. In other words, aggressive drivers may become more polite or vice versa depending on the model agent. As such, to make the simulations as realistic as possible, other approaches may be used.

For instance, while a simulation is run, the simulation may be monitored to identify any collisions or near collisions between the simulated vehicle and another agent is identified. If there are no collisions or near collisions, the software may be considered to have "passed" the simulation or may be considered to be validated for that specific simulation.

If a collision or near collision with an agent is identified, a new simulation is run with the agent replaced by a model agent. For instance, if example 600 results in a collision with the agent vehicle 622, agent vehicle 622 may be replaced with a model agent. The simulated vehicle of this second simulation may correspond to and/or be the same as the simulated vehicle 670 of the first or original simulation. The first simulation may also continue to run in order to collect additional data.

The type of model agent used in the new simulation may be selected from the model agents of storage system 450 based on the details of the agent defined in the log data used to run the new simulation. For instance, a small passenger vehicle may be replaced with another small passenger vehicle, a bicyclist may be replaced with a bicyclist, and so on. Characteristics of the agent in the log data such as location, heading, orientation, speed, etc. may be inserted into the model agent to increase realism of the new simulation. In some instances, the behavior of these model agents may be slightly altered from the log data. For instance, an agent vehicle may be replaced with a model agent that suddenly decides to drive more aggressively to ensure that the software is able to handle nearby aggressive actors.

In addition, these characteristics may be inserted when or immediately before an agent is replaced with a model agent. For example, if a driver of one of the agent vehicles was acting calmly then suddenly started driving aggressively, the replacement could also behave aggressively because that was the observed behavior at the time of replacement. Or if the model agent was already braking when replaced, the model agent may immediately brake as well. At this point, if there is still a collision or near collision with the model agent both of these simulations may be flagged for review by an operator.

If there are no collisions or near collisions, the software may be considered to have "passed" the simulation or may be considered to be validated for that specific simulation. If there is no collision or near collision with the model agent, but a collision or near collision with a second agent in the new simulation, another new simulation may be run with the second agent replaced with a model agent. For instance, if there is no collision or near collision with the model agent which replaced agent vehicle 622, but there is a collision with agent vehicle 624, a new simulation may be run where agent vehicle 624 is replaced with a model agent selected from storage system 450.

This may continue for a predetermined number of times, such as up to 5 model agents or new simulations, or until there are no agents that have not been replaced with model agents. At this point, if there is still a collision or near collision, all of these simulations may be flagged for review by an operator.

In another example, rather than iterating through simulations by replacing agents which collide or nearly collide with the simulated vehicle with a model agent, after a first simulation is run, a new simulation may be run where all of the agents in the first simulation which collide or nearly collide with the simulated vehicle may be replaced by model agents. In some instances, other agents may be removed entirely from the simulation. At this point, if there is still a collision or near collision both of these simulations may be flagged for review by an operator.

However, certain agents may neither be replaced nor removed. As noted above, agents may be replaced if it appears that the simulated change in the simulated vehicle's behavior has rendered the agent's behavior unrealistic and there is a model to make the agent's behavior more realistic. For instance, in the case of a parked vehicle or a vehicle that is not moving, the behavior (remaining parked) is very realistic. In this regard, parked vehicles would not need to be replaced with model agents. In other instances, an agent that is particular type of vehicle may not have a corresponding agent model in the storage system. As such, the agent would not be replaced as replacing the agent with a different type of agent model may not produce realistic behavior.

In order to identify problematic behaviors, in addition to monitoring for collisions or near collisions, the simulations may be monitored for specific types of behaviors which could cause problems with other road users in non-simulated situations. For instance, if the simulated vehicle (really, the software) responds to a simulation in a certain way, another agent may be added to the simulation to determine whether that response was effective and appropriate. For instance, if a real vehicle brakes hard or swerves in response to a road user or a false detection of an object, if there are no other road agents around, this is not a problem. However, if there are other road users around, such behaviors may not be appropriate responses and may actually lead to unintended collisions or near collisions if a real vehicle running the software were to respond the same way.

In order to ensure that a passing result would not result in unintended consequences in a slightly different situation, if a simulated vehicle is observed performing a particular action, a new scenario may be run with an additional model agent placed in a location and with characteristics corresponding to the type of the particular action. Agents that are added may be chosen based on statistical evidence indicating the probability that such an agent might actually manifest in that situation. This may provide a statistically meaningful representation of the overall risk from these problematic behavior at a higher granularity than from simulated collisions alone.

Figure 7:
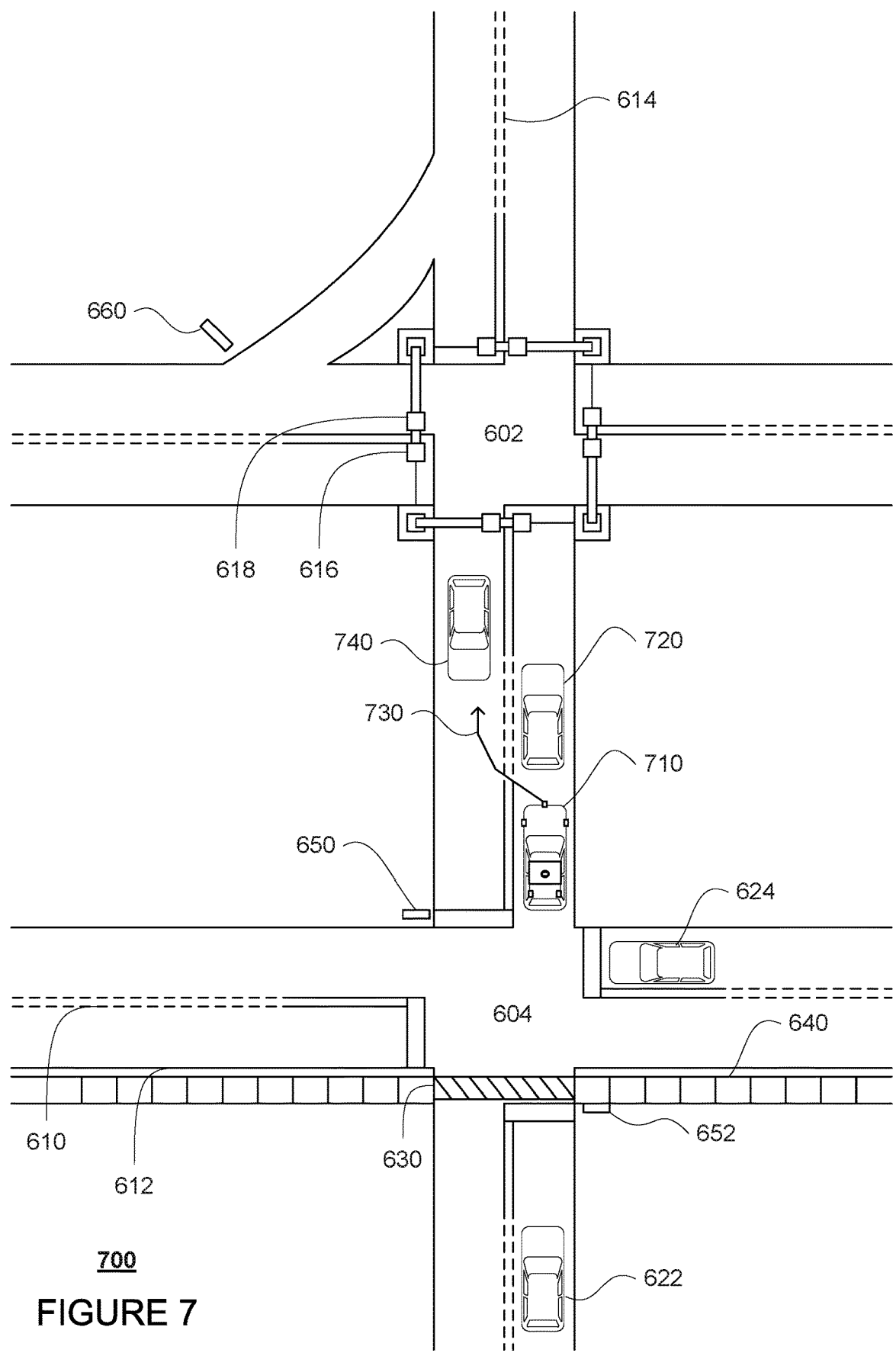
FIG. 7 is a further example representation of a simulation in accordance with aspects of the disclosure.

In one example, a particular action may include partially exiting and re-entering a lane. For instance, if a simulated vehicle in a first lane crosses a yellow line into an oncoming traffic lane or a white line into adjacent traffic lane but does not fully move into that lane but returns to the first lane, a new simulation may be run with a model agent placed in the oncoming traffic lane or the adjacent traffic lane such that the model agent would be in a location where the simulated vehicle passed through at the time when the simulated vehicle passed through the location when performing the particular action. As an example, turning to example 700 of FIG. 7, if a simulated vehicle 710 attempts to avoid a collision with agent vehicle 720 by swerving into an adjacent lane via path 730, a model agent, such as model agent 740, may be inserted into a new simulation in order to determine how the software would react if this swerving were not available. At this point, if there is a collision or near collision both of these simulations may be flagged for review by an operator.

Figure 8:
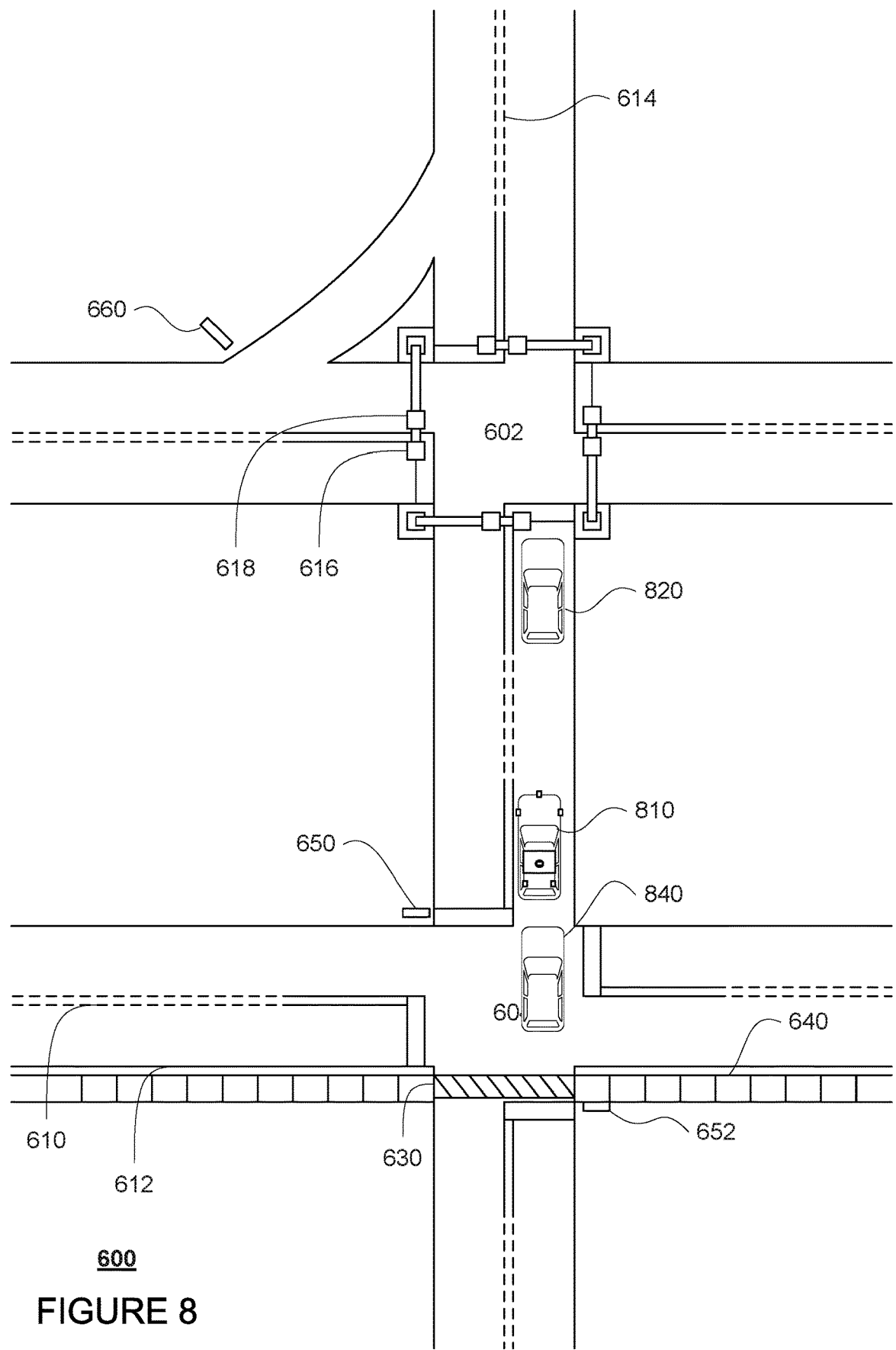
FIG. 8 is another example representation of a simulation in accordance with aspects of the disclosure.

As another example, a particular action may include decelerating or braking in a certain way. For instance, if a simulated vehicle decelerates so much over a predetermined period of time (such as a very hard braking action), a new simulation may be run with a model agent placed behind the vehicle such that the model agent would be in a location where the simulated vehicle passed through at the time when the simulated vehicle passed through the location when performing the particular action. As an example, turning to example 800 of FIG. 8, if a simulated vehicle 810 attempts to avoid a collision with agent vehicle 820 by a very hard braking action, a model agent, such as model agent 840, may be inserted into a new simulation immediately behind the simulated vehicle 870 in order to determine how the software would react. For instance, the vehicle may again brake very hard, no longer brake very hard, or may not brake at all. At this point, if there is a collision or near collision both of these simulations may be flagged for review by an operator.

As another example, a particular action may include accelerating and decelerating in a certain way. For instance, if a simulated vehicle swerves from a first lane into an adjacent lane, increasing and decreasing lateral acceleration in a first direction and thereafter increasing and decreasing lateral acceleration in a second opposite direction over a predetermined period of time, such that the vehicle effectively cancels a lane change, a new simulation may be run with a model agent placed in the first lane behind the vehicle to see if the vehicle would cause a collision with the model agent after cancelling the lane change. At this point, if there is a collision or near collision both of these simulations may be flagged for review by an operator.

Although the examples herein rely on simulations based on log data collected by a real vehicle, simulations may be generated from log data from a prior simulation, or possibly even a simulation that doesn't actually include such real-life driving data.

Figure 9:
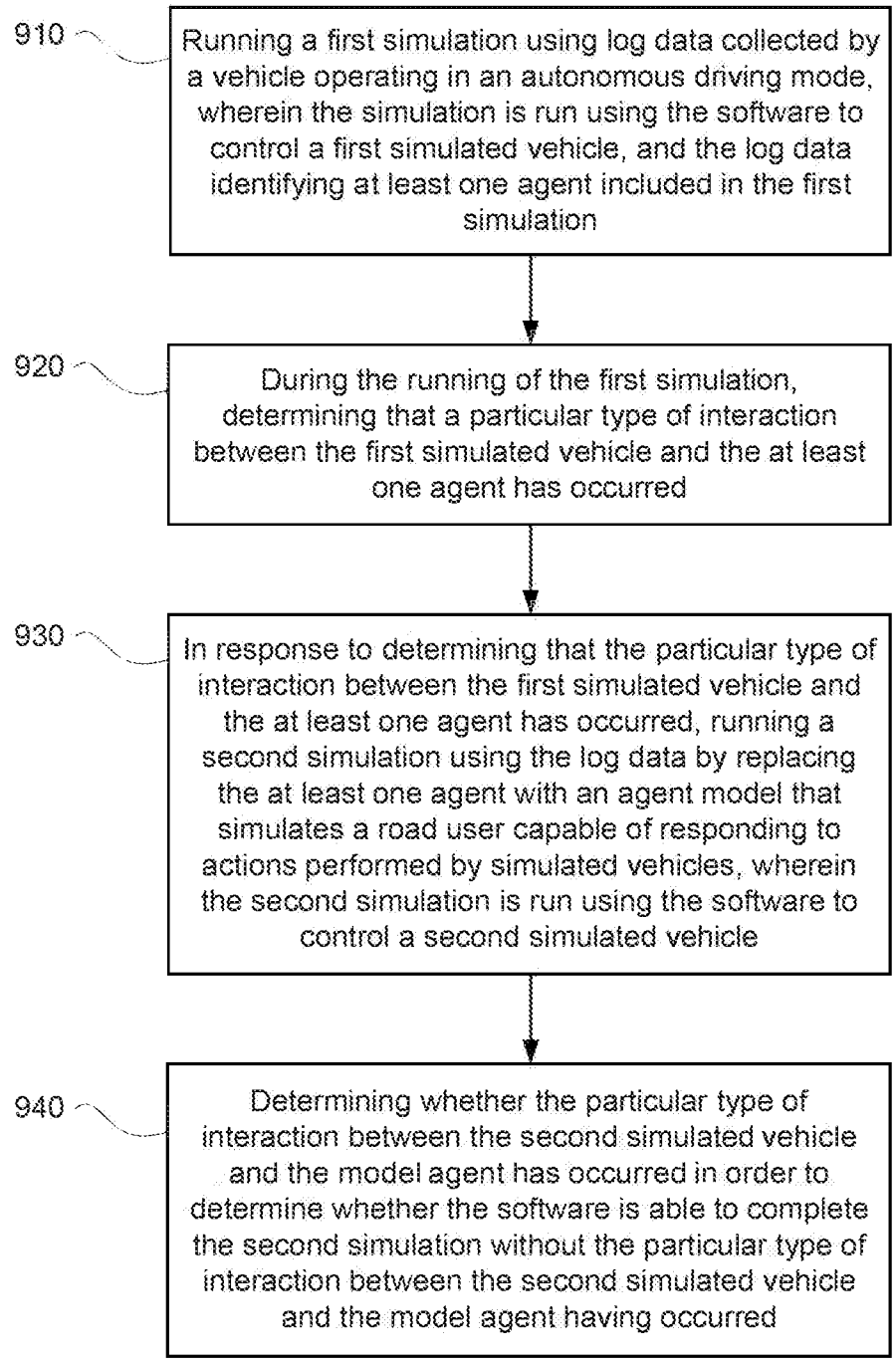
FIG. 9 is an example flow diagram in accordance with aspects of the disclosure.

FIG. 9 includes an example flow diagram 900 of some of the examples for testing software for controlling a vehicle in an autonomous driving mode, which may be performed by one or more processors such as processors of computing devices 410. For instance, at block 910, a first simulation is run using log data collected by a vehicle operating in an autonomous driving mode. The first simulation is run using the software to control a first simulated vehicle, and the log data identifies at least one agent included in the first simulation. At block 920, during (or after) the running of the first simulation, a particular type of interaction between the first simulated vehicle and the at least one agent is determined to have occurred. At block 930, in response to determining that the particular type of interaction between the first simulated vehicle and the at least one agent has occurred, a second simulation is run using the log data by replacing the at least one agent with a model agent that simulates a road user capable of responding to actions performed by simulated vehicles. The second simulation is run using the software to control a second simulated vehicle. At block 940, whether the particular type of interaction between the second simulated vehicle and the model agent has occurred is determined in order to determine whether the software is able to complete the second simulation without the particular type of interaction between the second simulated vehicle and the model agent having occurred.

Figure 10:
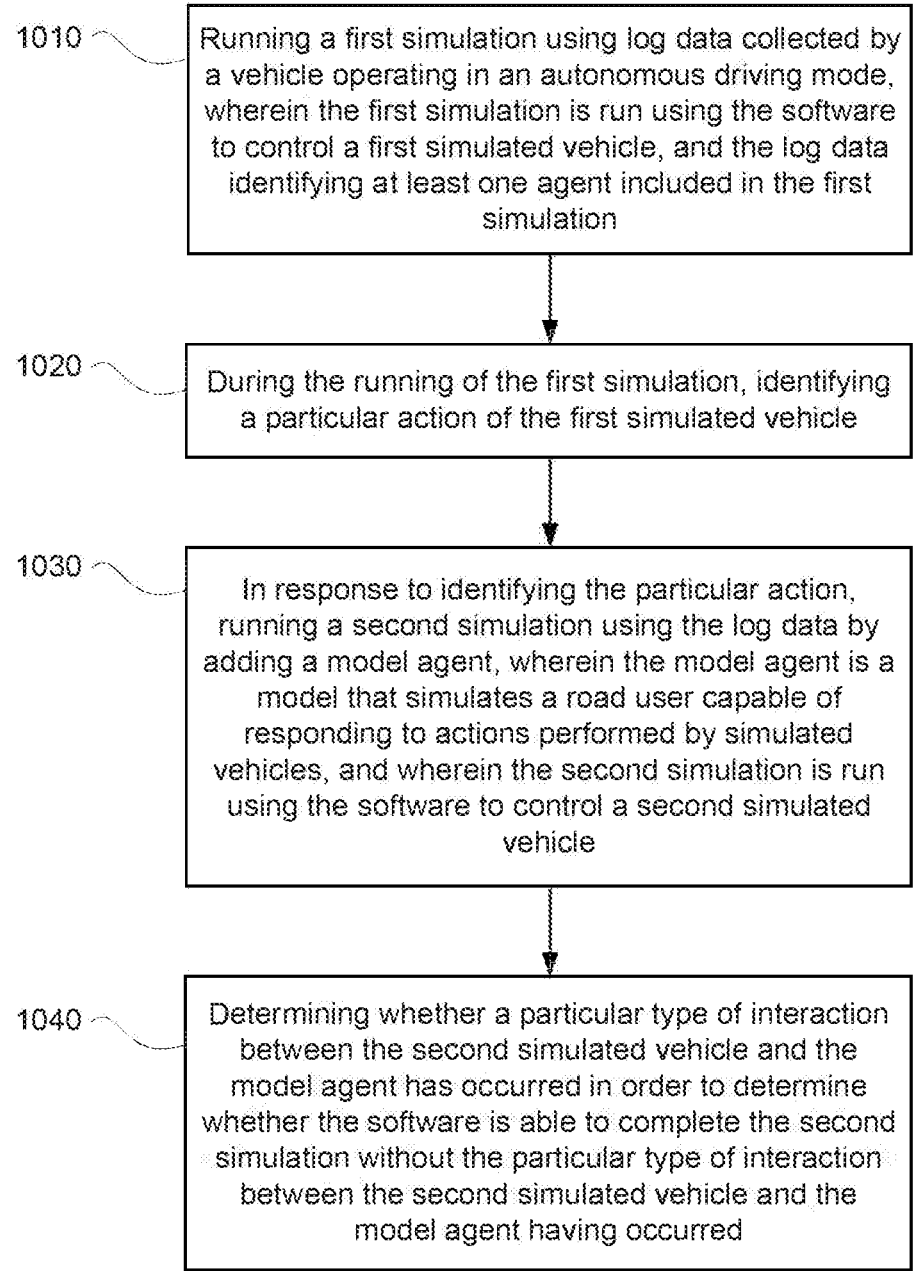
FIG. 10 is another example flow diagram in accordance with aspects of the disclosure.

FIG. 10 includes an example flow diagram 1000 of some of the examples for testing software for controlling a vehicle in an autonomous driving mode, which may be performed by one or more processors such as processors of computing devices 410. For instance, at block 1010, running a first simulation using log data collected by a vehicle operating in an autonomous driving mode. The first simulation is run using the software to control a first simulated vehicle, and the log data identifies at least one agent included in the first simulation. At block 1020, during (or after) the running of the first simulation, a particular action of the first simulated vehicle is identified. At block 1030, in response to identifying the particular action, a second simulation is run using the log data by adding a model agent, wherein the model agent is a model that simulates a road user capable of responding to actions performed by simulated vehicles. The second simulation is run using the software to control a second simulated vehicle. At block 1040, whether a particular type of interaction between the second simulated vehicle and the model agent has occurred is determined in order to determine whether the software is able to complete the second simulation without the particular type of interaction between the second simulated vehicle and the model agent having occurred.

The features described herein may provide for a safe, effective, and realistic way of testing software for autonomous vehicles. For instance, the software can not only be tested in hundreds of thousands of scenarios without endangering the life and property of actual persons. At the same time, replacing one or more agents with a model agent, the number of simulations that are flagged for review by an operator can be dramatically reduced while still ensuring that the software is tested as realistically as possible. This thus reduces the time and other resources required to review simulations that are not actually true "failures". In addition, those simulations that are flagged may be more critically important to determining how to revise or update the software being tested. Further, by adding in additional model agents "new" simulations can be created which allow for analysis of a plurality of potential safety issues without requiring new log data for such simulations. Other benefits may include the ability of a software developer to experiment with behavior changes and use this to display lots of realistic examples of how their change plays out. This could allow for much faster feature development, since the alternatives would involve the developer sifting through lots of spurious failures themselves, waiting for an operator to do the same, or to drive a real vehicle around with the behavior change to log real responses. Moreover, without such testing, the risks of injury to persons or property using untested software may be too great.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of testing software for operating a vehicle in an autonomous driving mode, the method comprising:
   accessing, from a storage system, log data collected by a vehicle operating in an autonomous driving mode,
   running, by one or more processors, a first simulation using the log data,
   wherein the first simulation is run using the software to control a first simulated vehicle, and
   wherein the log data identifies at least one agent included in the first simulation;
   during the running of the first simulation, determining, by the one or more processors, that a particular type of interaction between the first simulated vehicle and the at least one agent has occurred;

in response to the determining that the particular type of interaction between the first simulated vehicle and the at least one agent has occurred, running, by the one or more processors, a second simulation using the log data by replacing the at least one agent with a model agent that simulates a road user capable of responding to actions performed by simulated vehicles, wherein the second simulation is run using the software to control a second simulated vehicle; and determining, by the one or more processors, whether the particular type of interaction between the second simulated vehicle and the model agent has occurred in order to determine whether the software is able to complete the second simulation without the particular type of interaction between the second simulated vehicle and the model agent having occurred.

2. The method of claim 1, wherein the particular type of interaction is a collision, and the method further comprises, when a collision between the second simulated vehicle and the model agent is determined to have occurred, flagging the second simulation for further review.

3. The method of claim 1, further comprising:
when the software is determined to be not able to complete the second simulation without a collision, determining that the particular type of interaction between the second simulated vehicle and a second agent during the second simulation, the second agent being identified in the log data and included in the first simulation;
in response to determining the particular type of interaction between the second simulated vehicle and the second agent has occurred, running a third simulation using the log data by replacing the second agent with a second model agent that simulates a road user capable of responding to actions performed by simulated vehicles, and wherein the third simulation is run using the software to control a third simulated vehicle; and
monitoring the third simulation to determine whether the particular type of interaction between the second simulated vehicle and the second model agent has occurred in order to determine whether the software is able to complete the third simulation without the particular type of interaction between the third simulated vehicle and model agent having occurred.

4. The method of claim 3, further comprising, continuing to run additional simulations by replacing additional agents identified in the log data with model agents until a predetermined number of model agents is included in one of the additional simulations.

5. The method of claim 4, further comprising, when the particular type of interaction between the simulated vehicle and at least one model agent is determined for each of the additional simulations, flagging one or more of the first simulation, the second simulation, the third simulation, or the additional simulations for further review.

6. The method of claim 3, wherein the particular type of interaction is a collision, and the method further comprises, when a collision between the third simulated vehicle and the second model agent is determined, flagging the third simulation for further review.

7. The method of claim 1, further comprising, before running the second simulation, selecting the model agent from a plurality of different model agents based on a type of at least one agent.

8. The method of claim 1, further comprising:
identifying a particular action of the first simulated vehicle during the first simulation; and in response to identifying the particular action, running a second simulation using the log data by adding a second model agent, wherein the second model agent is a model that simulates a road user capable of responding to actions performed by simulated vehicles.

9. The method of claim 8, wherein the particular action includes partially exiting and re-entering a lane.

10. The method of claim 8, wherein the particular action includes decelerating a predetermined amount over a predetermined period of time.

11. The method of claim 8, wherein the particular action includes swerving within a lane.

12. The method of claim 8, wherein running the third simulation includes placing the second model agent at a location through which the simulated vehicle passes at a time when the simulated vehicle performed the particular action during the first simulation.

13. The method of claim 1, wherein the second simulated vehicle in the second simulation is a same simulated vehicle as the first simulated vehicle in the first simulation.

14. A method of testing software for operating a vehicle in an autonomous driving mode, the method comprising:
accessing, from a storage system, log data collected by a vehicle operating in an autonomous driving mode,
running, by one or more processors, a first simulation using the log data,
wherein the first simulation is run using the software to control a first simulated vehicle, and
wherein the log data identifies at least one agent included in the first simulation;
during the running of the first simulation, identifying, by the one or more processors, a particular action of the first simulated vehicle;
in response to the identifying the particular action, running, by the one or more processors, a second simulation using the log data by adding a model agent,
wherein the model agent is a model that simulates a road user capable of responding to actions performed by simulated vehicles, and
wherein the second simulation is run using the software to control a second simulated vehicle; and
determining, by the one or more processors, whether a particular type of interaction between the second simulated vehicle and the model agent has occurred in order to determine whether the software is able to complete the second simulation without the particular type of interaction between the second simulated vehicle and the model agent having occurred.

15. The method of claim 14, wherein the particular type of action is a collision and the method further comprises, when a particular type of interaction between the simulated vehicle and with the second model agent occurs, flagging the second simulation for further review.

16. The method of claim 14, wherein the particular action includes partially exiting and re-entering a lane.

17. The method of claim 14, wherein the particular action includes decelerating a predetermined amount over a predetermined period of time.

18. The method of claim 14, wherein the particular action includes swerving within a lane.

19. The method of claim 14, wherein running the second simulation includes placing the second model agent at a location through which the simulated vehicle passes at a time when the simulated vehicle performed the particular action during the first simulation.

20. The method of claim 19, wherein the second simulated vehicle in the second simulation is a same simulated vehicle as the first simulated vehicle in the first simulation.

* * * * *